United States Patent [19]

Gorman

[11] Patent Number: 4,548,339

[45] Date of Patent: Oct. 22, 1985

[54] INSULATED LIQUID CONTAINER

[76] Inventor: Michael W. Gorman, P.O. Box 2282, Port Charlotte, Fla. 33952

[21] Appl. No.: 598,032

[22] Filed: Apr. 9, 1984

[51] Int. Cl.$^4$ .......................... B67D 5/56; B65D 1/04
[52] U.S. Cl. ....................................... 222/129; 215/6; 220/20
[58] Field of Search ............ 215/6, 13; 220/20; 222/129, 481, 482; 428/35

[56] References Cited

U.S. PATENT DOCUMENTS

| 124,465 | 3/1872 | Weinberger | 215/6 |
| 2,814,423 | 11/1957 | Clare | 222/482 |
| 2,826,338 | 3/1958 | Davis | 222/129 |
| 3,012,695 | 7/1959 | Lerner | 222/129 |
| 3,756,470 | 9/1973 | Bagwell et al. | 222/129 |
| 4,098,397 | 7/1978 | Mann, Jr. et al. | 215/6 |
| 4,196,808 | 4/1980 | Pardo | 222/129 |

Primary Examiner—Alexander S. Thomas
Assistant Examiner—James J. Seidleck
Attorney, Agent, or Firm—Hauke and Patalidis

[57] ABSTRACT

A liquid container comprises an outer vessel within which are a plurality of individual liquid holding vessels each one of which has a liquid filling pipe or means and a liquid pouring-out means. Closures for each filling means and for each pouring-out means are provided. The individual inner vessels are spaced apart from each other and from the inner wall of said outer vessel and insulation means is disposed between the inner vessels and the inner-surface of the outer vessel. A bail is provided for carrying the liquid container.

9 Claims, 3 Drawing Figures

INSULATED LIQUID CONTAINER

BACKGROUND OF THE INVENTION

The present invention relates to portable insulated vessels for holding, transporting and maintaining liquids at stable temperatures.

Portable insulated vessels for holding and maintaining, for a period of time, liquids at stable temperatures, which are the temperatures of the liquids when introduced to the containers, are represented by conventional, so-called, vacuum bottles. Such vacuum bottles are so made that only one liquid may be carried therein at one time. However, the prior art, so far as known discloses in U.S. Pat. No. 124,465 a single container wherein water and beer are carried in separate containers in such a way that the liquids are separable by means of stop cocks inserted at the proper places in the vessels.

It is noted though that only liquids that are to be cooled or maintained at a temperature colder than ambient can be carried in the device of U.S. Pat. No. 124,465.

Those skilled in the art will recognize, however, from the following description of one embodiment of the invention, and from the drawing thereof, that a plurality of liquids may be carried in the device of the present invention and that the liquids of the present invention may be of different temperatures or the same temperature.

Thus, the liquid container of the present invention has a number of significant features and advantages over the known prior art that will become evident to those skilled in the art from the following description of the embodiment described and shown hereinafter.

SUMMARY OF THE INVENTION

A liquid container comprises an outer vessel within which are a plurality of individual liquid containers or vessels for holding various liquids. Insulation means is disposed between the individual inner vessels and the inner walls of the outer vessel. Means is provided for filling each individual inner vessel with liquid, and means is provided for pouring liquid out of each individual inner vessel. Means is provided for closing each filling means and each pouring-out means, and means for carrying the liquid container is provided.

For a further description and understanding of the invention, and for features and advantages thereof, reference may be made to the following description of one embodiment of the invention and a drawing thereof.

DETAILED DESCRIPTION

Figure 1:
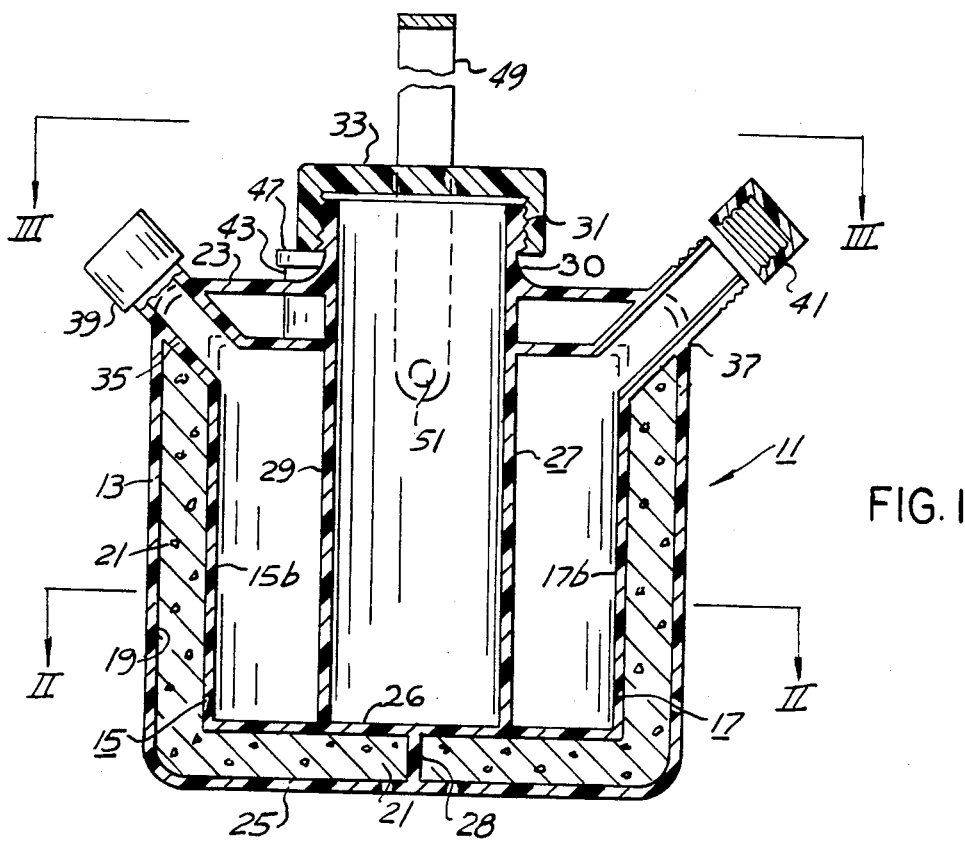
FIG. 1 is a schematic view, as a vertical cross section, of an insulated liquid container in accordance with one embodiment of the invention.
Figure 2:
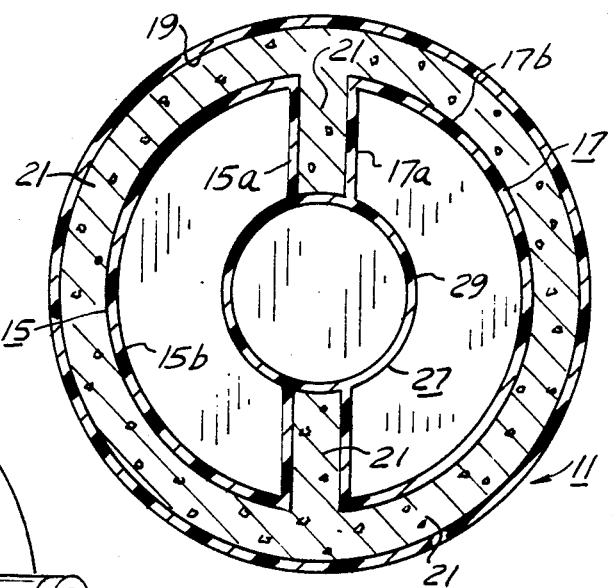
FIG. 2 is a view along line II—II of FIG. 1.
Figure 3:
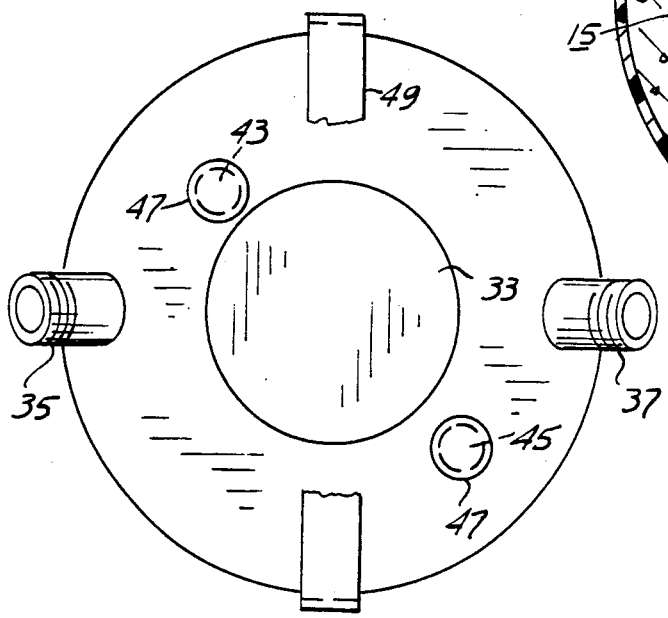
FIG. 3 is a view along line III—III of FIG. 1 showing the top of the container.

Referring to FIG. 1, an insulated liquid container 11, in accordance with the present invention, comprises a large outer vessel 13 made of suitable plastic material or thin metal, within which there are a plurality of separate, individual liquid containers or vessels. First and second inner vessels 15, 17 each has an arcuate wall 15b, 17b, that is connected to flat wall portions 15a, 17a that merge, as shown, with wall 29 of the third inner vessel 27. The vertical walls of the first, second and third inner vessels 15, 17 and 27 connect to a common bottom 26. The first and second inner vessels 15, 17 have each a horizontal top, as shown.

The walls of the inner vessels 15, 17, 27 may be made of suitable thin plastic material or stainless steel, as an alternative metalic material.

The inner vessels 15, 17 are spaced apart from each other and from inner wall 19, top 23, and bottom 25 of the large outer container 13. The spaces between the inner vessels 15, 17, 27 and the inner surface of the outer vessel 13 are filled with a suitable insulating material 21 such as Styrofoam, or the like. Likewise, the spaces between the inner vessels themselves are filled with the same thermal insulating material 21.

Concentrically located within the large outer vessel 13 is a cylindrical liquid container or vessel 27 that may be made of the same material as the other inner vessels 15, 17. The third inner vessel 27 has an extension 30 that protrudes through the top 23, and the outer top portion 31 of the vessel 27 is threaded to receive a screw cap closure 33.

The first and second inner vessels 15, 17, each has a vertical fill pipe 43, 45 that is suitably closed by a screw cap 47. Each fill pipe 43, 45 may, of course, be closed by a plug insert if desired or in any other preferred manner.

Each inner vessel 15, 17, 27 is spaced from the bottom 25, and the three inner vessels are supported thereon by a vertical wall 28.

The inner vessels 15, 17 each has a pouring-out spout 35, 37 respectively that is angularly disposed from the top corner of each vessel 15, 17 as shown in FIG. 1. Each pouring-out spout is provided with a closure 39, 41 respectively that may be a screw cap like that shown or a plug-in closure if desired.

A conventional type of bail 49 is pivotally attached to the outer container 13, as at 51, for the purpose of carrying the liquid container 13.

In use the inner containers or vessels 15, 17 may carry either hot or cold liquids that will remain at the incipient temperature since the inner vessels are well insulated from the ambient temperature.

When a hot liquid is carried in one container, say 15, and a cold liquid is carried in another container, say 17, the cylindrical container 27 would remain empty and acts as an air space between containers carrying liquids at different temperatures.

In some instances, both the inner vessels 15, 17 may contain cold liquids, and in such instances, the cylindrical container 27 may hold ice or the like to maintain the liquids cold.

If both the inner vessels 15, 17 hold hot liquids, the cylindrical inner vessel 27 may also hold a hot liquid. Each hot liquid may be different from another. As an example, hot coffee may be contained in vessel 15; hot tea in vessel 17; and hot cocoa in vessel 27.

From the foregoing description of the one embodiment of the invention and the drawing thereof set forth herein, those skilled in the art will recognize several features and advantages thereof among which the following are noted:

That two or three distinct liquids may be carried simultaneously in the container of the invention;

That the container is both simple to construct and is easily carried from place to place;

That it is efficient in keeping liquids at incipient temperatures;

That the contained liquids can be easily dispensed;

That three or more inner vessels may be disposed in the outer container whereby different liquids may be carried therein;

That the individual inner vessels may contain either hot or cold liquids in each vessel, or hot and cold liquids in different vessels therein; and That the individual inner containers may hold cold liquids that are maintained at incipient temperature by a cold substance in the third inner vessel.

Whereas, the invention has been described in relation to one embodiment thereof, it is understood that other modifications may be made therein without departing from the spirit thereof and the scope of the appended claims.

What is claimed is:

1. An insulated liquid container comprising,
   (a) an outer vessel having a top, side wall and a bottom;
   (b) a first inner liquid receptive vessel within said outer vessel and spaced apart from the inner wall of said outer vessel;
   (c) a second inner liquid receptive vessel within the outer vessel and spaced apart from both said first inner liquid receptive vessel and said inner wall of the outer vessel;
   (d) a third inner liquid receptive vessel within said outer vessel and spaced apart from the inner wall, top and bottom of said outer vessel, said third inner liquid receptive vessel having a wall portion that is common to both said first and said second inner liquid receptive vessels, and having an extension that protrudes through said top;
   (e) means for filling individually said first, second and third inner liquid receptive vessels; and
   (f) means for emptying individually liquid from said first, second and third inner liquid receptive vessels.

2. The invention of claim 1 including,
   (a) thermal insulating means disposed in the spaces between said first and second inner liquid receptive vessels and the inner wall of said outer vessel; and
   (b) thermal insulating material disposed between said first, second and third inner liquid receptive vessels and the inner wall of said outer vessel.

3. The container of claim 1 wherein,
   (a) said means for filling said first and second inner vessels comprises a fill pipe communicating with each said vessel;
   (b) closure means is provided for each fill pipe;
   (c) said means for filling said third inner vessel comprises an extension thereof protruding through and above the top of said outer vessel; and including
   (d) closure means for said extension.

4. The container of claim 3 wherein,
   (a) said closures comprise screw caps threaded onto each of said fill pipes and onto said extension.

5. The container of claim 1 including,
   (a) a bail pivotally mounted to said outer container.

6. The container of claim 1 wherein,
   (a) said means for emptying said first and second inner vessels includes a pouring spout having a threaded outer end portion angularly disposed with respect to each one of said inner vessels, and removable screw caps threaded thereonto said end portions.

7. An insulated liquid container comprising,
   (a) an outer vessel having a top, bottom and side wall;
   (b) a first inner liquid receptive vessel spaced apart from the inner surface of said side wall and said top and bottom;
   (c) a second inner liquid receptive vessel spaced apart from said first inner liquid receptive vessel and from the inner surface of said side wall, top and bottom;
   (d) a third inner liquid receptive vessel having a common wall portion with both said first and second inner liquid receptive vessels, and having an extension portion that protrudes through said top and extends thereabove;
   (e) selective means for admitting a liquid into said first, second and said third inner liquid receptive vessels;
   (f) individual closure means for said liquid admitting means for said first, said second, and said third inner liquid receptive vessels;
   (g) pouring-out means for liquid within said first inner liquid receptive vessel;
   (h) pouring-out means for liquid within said second inner liquid receptive vessel;
   (i) pouring-out means for liquid within said third inner liquid receptive vessel;
   (j) closure means for said pouring-out means for said first inner liquid receptive vessel;
   (k) closure means for said pouring-out means for said second inner liquid receptive vessel;
   (l) thermal insulating means within said outer vessel disposed between said first inner liquid receptive vessel, said second inner liquid receptive vessel, said third inner liquid receptive vessel and the inner wall of said outer vessel and the top and the bottom of said outer vessel;
   (m) thermal insulating means disposed within said outer vessel and between said first and second inner liquid receptive vessels, and the top and bottom of said outer vessel; and
   (n) a bail pivotally mounted to said outer vessel.

8. The invention of claim 7 wherein,
   (a) said closure means for said extension is a screw cap; and
   (b) said closure means for said pouring-out means of both said first and second inner liquid receptive vessels are screw caps.

9. The invention of claim 7 wherein,
   (a) said closure for each liquid admitting means is a screw cap.

* * * * *